United States Patent [19]

Robin et al.

[11] 3,843,600

[45] Oct. 22, 1974

[54] STABILIZATION OF OLEFIN POLYMERS

[75] Inventors: Michael Robin, Colonia, N.J.; Sheldon R. Schulte, Columbus, Ohio

[73] Assignee: Ashland Oil, Inc., Ashland, Ky.

[22] Filed: May 8, 1972

[21] Appl. No.: 251,170

[52] U.S. Cl. ........ 260/45.95 C, 260/608, 260/609 F
[51] Int. Cl. ...................... C08f 45/50, C08g 51/58
[58] Field of Search............. 260/45.95 C, 404, 608, 260/609 F

[56] References Cited
UNITED STATES PATENTS

| | | | |
|---|---|---|---|
| 2,670,382 | 2/1954 | Downey et al. | 260/45.95 |
| 2,841,627 | 7/1958 | Beaver et al. | 260/45.95 |
| 3,057,926 | 10/1962 | Coffield et al. | 260/45.95 |
| 3,070,569 | 12/1962 | Rosenthal | 260/45.95 |
| 3,129,213 | 4/1964 | Worrel | 260/45.95 |
| 3,377,333 | 4/1968 | Ciesielski et al. | 260/609 |
| 3,406,158 | 10/1968 | Brown et al. | 260/45.95 |
| 3,647,885 | 3/1972 | Geering et al. | 260/45.95 |

OTHER PUBLICATIONS
ACS Meeting Div. Organic Coatings and Plastics Chemistry—21, No. 2, 1961, pp. 79 to 106.

Primary Examiner—Donald E. Czaja
Assistant Examiner—Eugene C. Rzucidlo

[57] ABSTRACT

Olefin polymers, such as polyethylene, polypropylene and polybutene of increased stability against oxidative deterioration containing a compound of the general formula:

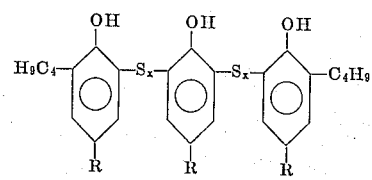

wherein x is an integer from 1 to 2, and each R individually is an alkyl radical of 1-4 carbon atoms, provided that at least one R is $CH_3$.

12 Claims, No Drawings

STABILIZATION OF OLEFIN POLYMERS

BACKGROUND OF THE INVENTION

The present invention relates to the stabilization of olefin polymers against oxidative deterioration. More particularly, the present invention is concerned with olefin polymers of increased stability against oxidative degradation which contain certain tris phenol sulfides.

Olefin polymers may be fabricated to form many useful articles. However, such polymers are susceptible, in varying degrees, to degradation caused by exposure to light. Severe degradation occurs when the polymer is exposed to light in the ultraviolet portion of the spectrum. In addition, the unstabilized polymer is degraded by oxygen especially when subjected to elevated temperature and/or mechanical working. Degradation apparently results from free radial formation, which formation is promoted by mechanical work, heat, ultraviolet light, and impurities such as metals and metal compounds.

The free radicals which are formed undergo further chemical reactions, resulting in undesirable chemical and physical transformations in the polymer. Thus, after a variable period of time, there is a premature deterioration of the polymer. Such deterioration may result in a loss in tensile strength, molecular weight and other desirable properties such as pliability and impact strength. In addition, discoloration and embrittlement of the polymer may be observed.

Numerous materials have been suggested as antioxidant additives for such polymers but various of these materials are not altogether satisfying either in terms of their versatility and/or performance under stringent conditions of temperature and mechanical working, and particularly at temperatures of 250° F and higher. One problem which has frequently been encountered is the failure of various suggested materials to satisfactorily perform in more than one type of olefin polymer. For instance, various materials which protect ethylene polymers against oxidation to an acceptable extent are of little practical use when incorporated into propylene polymers. Likewise, various materials which protect propylene polymers against oxidation to an acceptable degree are of little practical use in ethylene polymers. Accordingly, work is continually being carried out to discover materials which are acceptable antioxidants for olefin polymers in general and particularly for both ethylene and propylene polymers.

Those skilled in the art have long recognized the empirical nature of antioxidant technology and the extreme difficulty of predicting whether a particular polymer will be effectively stabilized against oxidation by the incorporation of a given compound. Whether any commercially worthwhile level of oxidation protection is attained and the extent thereof depends both upon the nature of the material to be protected and the exact structure of the antioxidant compound, and is most frequently unpredictable. Thus, Downey and Zerbe, in U.S. Pat. No. 2,670,382, observed that, "it is now known that the number, size, position and kind of substituted group [in the antioxidant compound] exerts a profound influence on the antioxidant properties of the substituted phenol sulfides." A typical comment on the influence of the material which is to be stabilized may be found in *Modern Plastics*, Volume 37, page 192, January, 1960, which states: "Of all the problems that polypropylene producers have faced, stabilization has been perhaps the most difficult. Polypropylene, when it is unstabilized, deteriorates rapidly upon exposure to heat or ultraviolet light. The difficulty with proper stabilization of polypropylene is that in general, the vast numbers of stabilizers for other polyolefins, vinyl chlorides and the like proved ineffective for polypropylene. It was necessary to develop unique systems for specific end uses." Moreover, the empiric nature of the art of stabilizing polyolefins with phenolic stabilizers was recognized by the Court of Customs and Patent Appeals in *In re Thompson*, 169 USPQ 35, 37.

Rosen and R. Thomas, in U.S. Pat. No. 2,244,021, suggest that various polymers such as polyisobutylene, hydrogenated rubber and hydrogenated polymers of diolefins such as isoprene and butadiene can be stabilized against depolymerization by incorporating therein certain bis phenol sulfides, compounds including two phenolic nuclei bridged or connected to one another by a sulfur linkage containing at least one sulfur atom such as 4,4'-thiobis (2-amylphenol).

Tris phenol sulfides, compounds including three phenolic nuclei linked by two sulfur bridges such as

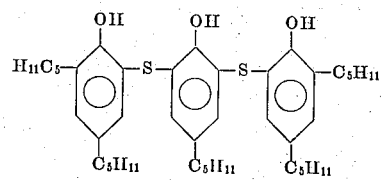

and metal salts of such compounds, were discussed by Cook and W. Thomas. They disclosed in U.S. Pat. No. 2,336,074 that such compounds would stabilize lubricating oils against oxidation and sludge formation. Later, Downey et al., in U.S. Pat. No. 2,670,382, suggested that oxidation inhibitors for rubbery polymers could be produced by reacting two molecular equivalents of a 3,6-di-substituted phenol with one molecular equivalent of sulfur dichloride to produce a bis phenol sulfide such as one having the following structure:

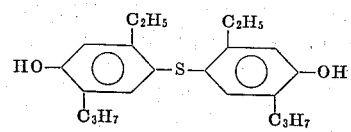

Downey et al., reported that attempts to increase the sulfur content of the phenol sulfide produced composite reaction products including some compounds which contained more than two phenol nuclei linked together by sulfur atoms. Downey et al., seem to indicate that the presence of compounds containing more than two phenol nuclei cause some loss in the antioxidant properties of the composite reaction products as compared with the bis phenol sulfide in the rubbery polymers.

Apparently in conformity with the negative teachings of Downey et al., the rather comprehensive disclosure of Salyer and Kenyon in U.S. Pat. No. 2,985,617 relative to phenol sulfide thermal processing co-stabilizers for Ziegler polyethylene and polypropylene fails to discuss a single tris phenol sulfide. Also, although Bailey's U.S. Pat. No. 3,067,259 relative to alkoxy substituted phenolic stabilizers for polyethylene and polypropylene includes a general formula for trinuclear phenols embracing a myriad of methylene, ethylidene, isopropylidene and sulfur bridged tris phenols, not one specific tris phenol sulfide compound is discussed.

More recently, in U.S. Pat. No. 3,423,389, Wheelus has reported that bis and higher phenol sulfides are helpful in improving the color and color retention of tall oils and rosin compounds during bleaching. Due to the differences which exist between these compounds and the lubricating oils and polymers discussed by the previously mentioned references, the relationship, if any, between the work of Wheelus and the problems of olefin polymer stabilization is not apparent.

Therefore, an object of the present invention is to provide increased stabilization for olefin polymers against oxidation which is sufficiently versatile to be effective for olefin polymers in general and specifically for ethylene polymers and propylene polymers.

A further object is to provide polymers of olefins capable of being heat formed into film, sheeting and molded articles characterized by improved resistance to oxidative deterioration during and after processing at elevated temperatures.

BRIEF SUMMARY OF THE INVENTION

The present invention is directed to an olefin polymer composition of increased stability against oxidative degradation containing an olefin polymer and an effective stabilizing amount of compound of the general formula:

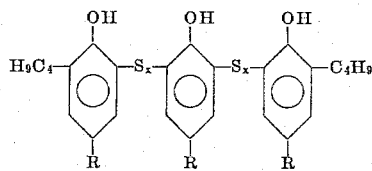

wherein $x$ is an integer from 1–2 and each R individually is an alkyl radical of 1–4 carbon atoms, provided that at least one R is $CH_3$.

The present invention is further concerned with increasing the stability of the olefin polymer against degradation caused by thermal processing which comprises incorporating in said polymer prior to completion of the thermal processing an effective stabilizing amount of compound of the general formula:

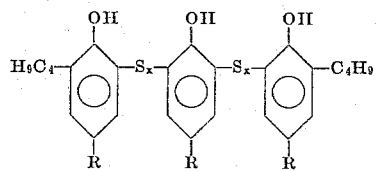

wherein $x$ and R have the same meanings as defined above.

DESCRIPTION OF PREFERRED EMBODIMENTS

The olefin polymers to which the present invention is applicable are solid homopolymers of olefins, copolymers of two or more olefins, and copolymers of at least one olefin with one or more ethylenically unsaturated copolymerizable monomers. In particular, the olefin polymers to which this invention is applicable are polymers of mono-olefins containing 2 to 4 carbon atoms and preferably polymers of α-olefins such as ethylene, propylene and butene-1.

Generally the polymers employed in the present invention contain at least about 85 percent by weight of at least one olefin. Some examples of suitable ethylenically unsaturated comonomers which are copolymerizable with the above described preferred α-olefins containing 2–4 carbon atoms include styrene, vinyl chloride, vinyl acetate, vinylidene chloride, vinylidene chlorofluoride, methylmethacrylate, butadiene, isoprene, 3-ethylbutene-1, 4-methylpentene-1, 4,4-dimethylpentene-1, 3-methylpentene-1, and the like. Thus, any olefin polymer within the foregoing definition or mixtures of such polymers may be employed whether it includes a molecular structure which is crystalline, or amorphous or both.

Thus, the polymers of ethylene which are employed may, for example, be similar to the essentially linear and unbranched polymers of relatively high molecular weight which are obtained under relatively low pressures of 1–100 atmospheres using such catalysts to polymerize the ethylene as mixtures of strong reducing agents and compounds of Group IVB, VB, and VIB metals of the periodic system, chromium oxide on silicated alumina, hexavalent molybdenum compounds and charcoal supported nickel-cobalt. Polyethylene may also be prepared with peroxide or azo catalysts and water or organic liquid reaction media with moderately high pressures, for example, 300–700 atmospheres. Or the polymers of ethylene may be similar to those which are obtained by polymerizing ethylene in a basic aqueous medium and in the presence of polymerization-favoring quantities of oxygen under higher pressures in the range of 500–3,000 and preferably 1,000–2,700 atmospheres at temperatures between 150° and 275° C.

Similarly, when the starting monomer is propylene and/or butene-1, any of the available methods may be used to convert them into applicable polymers. Non-limiting examples of appropriate production methods for propylene polymers employed in accordance with the present invention are those involving the polymerization of propylene in the presence of catalysts disclosed in Belgian Pat. Nos. 530,617; 533,362; 535,082 and 538,782.

Olefin polymers prepared by the processes described above have melting points of from 100° C to 300° C, a tensile strength of from 1,000 to 10,000 lbs. per square inch and a molecular weight of from 6,000 to 3,000,000 and preferably 20,000 to 1,000,000. Usually a mixture of crystalline and amorphous polymer is obtained. If desired, the amorphous polymer can be separated from the crystalline polymer by contacting a mixture thereof with a hydrocarbon solvent, such as isooctane or n-heptane at an elevated temperature. The amorphous polymer is substantially soluble under these conditions, whereas the crystalline polymer is substantially insoluble.

In accordance with the present invention, an olefin polymer as described above has incorporated therein a tris phenol sulfide of the general formula:

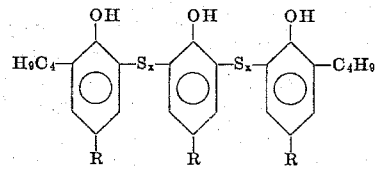

wherein $x$ is an integer of from 1 to 2, and each R individually is an alkyl radical of 1–4 carbon atoms, provided that at least one R is $CH_3$. $x$ in the above formula is preferably equal to 1. It is also preferred that the R substituent on the middle phenolic group is $CH_3$.

The tris phenol sulfides in accordance with the above formula are employed in a small but effective amount. The amount is sufficient to provide at least some protection to the polymer against the effects of thermal processing. Such small but protective amount is usually within the range of about 0.005 to about 5 weight percent, based upon the weight of the polymer and preferably from about 0.01 to about 1.5 weight percent based upon the weight of the polymer. The particular amount of material employed within these ranges depends upon the type of polymer to be stabilized. For instance, it is generally preferred to use about 0.01 to about 0.5 weight percent based on the weight of polymer when stabilizing an ethylene polymer and from about 0.01 to about 1.5 weight percent when stabilizing a propylene polymer.

The tris phenol sulfides encompassed within the above formula are conveniently obtained by the action of sulfur monochloride ($S_2Cl_2$) or sulfur dichloride ($SCl_2$) on a 4-alkylphenol and a 2-butyl-4-alkylphenol in a suitable solvent medium. When convenient or desirable, other methods of synthesis may be used, and it is to be understood that this invention is not limited to any particular method of synthesis but pertains broadly to the use of the materials described. Also, while the compounds to be used in accordance with the present invention have been described with the aid of a structural formula, it will be appreciated that some if not all of the available production methods may produce minor quantities of other molecules derived from the starting materials which do not correspond exactly with the structural formula. Usually the quantity of such impurities is less than about 10 percent and most often less than about 5 percent by weight of the desired tris phenol sulfide. These other materials may or may not be separated from the depicted tris phenol sulfide before their use in the invention, and it should therefore be understood that the claims appended hereto are intended to cover the use of the essentially pure tris phenol sulfide compound as well as composite reaction products in which they are the major components(s). The weight of those other compounds in the composite reaction products which are effective in stabilizing the polyolefins may be counted with the weight of the tris phenol sulfide compound of the above formula in determining the amount of said compound which is present.

The present invention is of particular importance in increasing the stability of the olefin polymer against degradation caused by thermal processing whereby the sulfide is incorporated in the polymer prior to completion of the thermal processing and preferably is incorporated while the polymer is still at about room temperature. The sulfides employed according to the present invention are preferably utilized for protecting olefin polymers during thermal processing at temperatures of at about 250° to about 450° F and preferably at temperatures of about 300° to about 350° F.

There are numerous methods that can be used to treat olefin polymers with tris phenol sulfides in accordance with the invention. One method is to incorporate the tris phenol sulfide during cold milling of the polymer, i.e., during the treatment of the polymer on conventional rubber mills without the addition of external heat. In order to obtain maximum dispersion of the tris phenol sulfide in the polymer, it is preferred that the phenol sulfide be dissolved in suitable solvent, e.g., methanol, ethanol benzene, toluene, and that the resulting solution be added to the polymer on the rolls. Ordinarily, a volatile solvent is used which will readily evaporate, although if the intended use of the polymer permits or renders desirable the incorporation of a high molecular weight diluent for the purpose of plasticizing or otherwise affecting the polymer, this may be done. The tris phenol sulfide can also be incorporated in the polymer in other mixing devices, for example, Banburry mixers and extruders. The polymer can be dissolved in a solvent, for example, hot aromatic hydrocarbons such as benzene or xylene, followed by mixing the tris phenol sulfide in proper proportions with the polymer solution and the use of said solution for casting films, spinning fibers and similar operations that are well known to the art, wherein the solvent is evaporated away from the polymer, resulting in the formation of films, fibers, monofilaments and the like. Moreover, finely divided particles of the polymer may be slurried in a solvent solution of the tris phenol sulfide compound, following which the solvent is evaporated to leave the particles of polymer intimately admixed with the tris phenol sulfide compound.

It will be understood that in any of these methods of treating the polymer with the phenol sulfide, during such treating, or before or after, conventional fillers, dyes, pigments, modifying polymers, and the like can be admixed with the ethylene polymers described above.

The following non-limiting examples are provided to further illustrate the present invention. All parts are by weight unless the contrary is stated.

EXAMPLE 1

To a glass reaction vessel equipped with an agitator, a thermometer, a condenser to which is connected a means for scrubbing evolved HCl are added with agitation 750 parts toluene, 216 parts paracresol, and 656 parts of 2-t-butyl-4-methylphenol. While maintaining the temperature between 20° and 30° C, 424 parts of sulfur dichloride are added with agitation over a period of approximately 2–3 hours, during which HCl is evolved. Upon completion of the addition, the reaction mixture is agitated at room temperature for an additional hour. The reaction mixture is then heated to 40° C and is held at that temperature for 1 to 2 hours to insure completion of the reaction as evidenced by cessation of HCl evolution. 750 Parts of water are added to the reaction mixture with vigorous agitation. The agitation is stopped and the mixture is transferred to a separating funnel. The mixture stratifies into a lower aqueous layer and upper organic layer. The lower aqueous layer is removed and discarded. To the remaining organic layer are added with agitation 500 parts of water and 50 parts of a 10 percent aqueous disodium hydrogen phosphate solution. The agitation is continued until the organic layer, water, and phosphate are thoroughly mixed. The agitation is then stopped and the mixture upon standing stratifies into a lower aqueous layer and an upper organic layer, which is now essentially neutral. The aqueous layer is removed and discarded. The remaining organic layer is washed twice with 500 parts of water and the residual water and solvent are removed by vacuum distillation. 985 parts of $\alpha, \alpha'$-thio (3-t-butyl-2-hydroxy-5-methylphenyl)p-cresol are obtained.

EXAMPLE 2

The above procedure is repeated except that one mole of sulfur monochloride is substituted for each mole of sulfur dichloride. 1,100 parts of α, α'-dithio(3-t-butyl-2-hydroxy-5-methylphenyl)p-cresol are obtained.

EXAMPLE 3

To a glass reaction vessel equipped with an agitator, a thermometer, a condenser to which is connected a means for scrubbing evolved HCl are added with agitation 1,525 parts toluene, 270 parts paracresol, and 1,030 parts of 2,4-di-t-butylphenol. While maintaining the temperature between 20° and 30° C, 515 parts of sulfur dichloride are added with agitation over a period of approximately 2–3 hours, during which HCl is evolved. Upon completion of the addition, the reaction mixture is agitated at room temperature for an additional hour. The reaction mixture is then heated to 40° C and is held at that temperature for 1 to 2 hours to insure completion of the reaction as evidenced by cessation of HCl evolution. 1,500 parts of water are added to the reaction mixture with vigorous agitation. The agitation is stopped and the mixture is transferred to a separating funnel. The mixture stratifies into a lower aqueous layer and upper organic layer. The lower aqueous layer is removed and discarded. To the remaining organic layer are added with agitation 500 parts of water and 50 parts of a 10 percent aqueous disodium hydrogen phosphate solution. The agitation is continued until the organic layer, water, and phosphate are thoroughly mixed. The agitation is then stopped and the mixture upon standing stratifies into a lower aqueous layer and an upper organic layer, which is now essentially neutral. The aqueous layer is removed and discarded. The remaining organic layer is washed twice with 500 parts of water and the residual water and solvent are removed by vacuum distillation. 1,000 parts of α, α'-thio(3,5-di-t-butyl-2-hydroxyphenyl)-p-cresol are obtained.

EXAMPLE 4

The product prepared according to Example 1 is admixed with a polyethylene of 0.960 density and 300,000 molecular weight available under the trade designation USI Petrothene in a steel container and the mixture is extruded twice at 300° F. The concentration of the product made according to Example 1 is then adjusted to 0.1 percent by weight of the polymer by the addition of more of the polyethylene and the mixture is again extruded twice under the same conditions. The resulting polyethylene composition is then pressed into a 6–6.5 mil film at 310° F and 1,280 psi on a 10 inch hydraulic ram press. Likewise, there are prepared according to the above-described method, a film of the same polyethylene without any antioxidant and films of the same polyethylene containing 0.1 percent of the following:

α, α'-thio(3-t-butyl-2-hydroxy-5-methylphenyl)-p-methoxyphenol;
2,6-bis(3'-t-butyl-2'-hydroxy-5'-methylbenzyl)-4-methylphenol;
2,2'-thiobis(6-t-butyl-4-methylphenol);
2,2'-methylenebis(6-t-butyl-4-methylphenol);
α,α'-thio(3,5-dimethyl-2-hydroxyphenyl)-p-cresol;
α,α'-thio(3-methoxy-2-hydroxy-5-methylphenyl)-p-cresol;
α,α'-thio(3-nonyl-2-hydroxy-5-methylphenyl)-p-cresol; and
α,α'-thio(3,5-di-t-butyl-2-hydroxyphenyl)-4-t-butylphenol.

EXAMPLE 5

The product prepared according to Example 1 is admixed with a polypropylene of 0.90 density and approximately 325,000 molecular weight available under the trade designation Pro-Fax 6,501 from Hercules in a steel container and the mixture is extruded twice at 380° F. The resulting polypropylene composition containing 0.5 percent by weight of the product made according to Example 1 is then pressed into a 6–6.5 mil film at 350° F and 1,280 psi on a 10 inch hydraulic ram press. Likewise, there are prepared according to the above procedure a film of the same polypropylene without any antioxidant and films of the same polypropylene containing 0.5 percent of the following:

α,α'-thio(3-t-butyl-2-hydroxy-5-methylphenyl)-p-methoxyphenol;
2,6-bis(3'-t-butyl-2'-hydroxy-5'-methylbenzyl)-4-methylphenol;
2,2'-thiobis(6-t-butyl-4-methylphenol);
2,2'-methylenebis(6-t-butyl-4-methylphenol);
α,α'-thio(3,5-dimethyl-2-hydroxyphenyl)-p-cresol;
α,α'-thio(3-methoxy-2-hydroxy-5-methylphenyl)-p-cresol;
α,α'-thio(3-nonyl-2-hydroxy-5-methylphenyl)-p-cresol; and
α,α'-thio(3,5-di-t-butyl-2-hydroxyphenyl)-4-t-butylphenol.

EXAMPLE 6

The polyethylene films produced in Example 4 are simultaneously introduced into a forced draft oven which is continuously maintained at 125° ± .1° C and the polypropylene films produced in Example 5 are simultaneously introduced into a forced draft oven which is continuously maintained at 150° ± 1° C. The absorbence of the films in the carbonyl region, 5.8 microns of the IR spectrum is then recorded periodically. When absorbence reaches 94 percent the sample is considered to be "oxidized," and the time of exposure to reach this point is recorded in the table below:

| | Additive | Time in hours to reach 94% absorbence | |
|---|---|---|---|
| | | In polyethylene | In polypropylene |
| (A) | 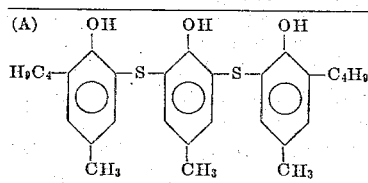 α,α'-Thio(3-t-butyl-2-hydroxy-5-methylphenyl)-p-cresol (product prepared according to Example 1.) | 1,661 | 180 |

| Additive | Time in hours to reach 94% absorbence | |
|---|---|---|
| | In polyethylene | In polypropylene |
| (B) None | 59 | 8 |
| (C) α,α'-Thio(3-t-butyl-2-hydroxy-5-methylphenyl)-p-methoxyphenol. | 1,620 | 91 |
| (D) 2,6-bis(3'-t-butyl-2'-hydroxy-5'-methylbenzyl)-4-methylphenol. | 887 | 118 |
| (E) 2,2'-thiobis(6-t-butyl-4-methylphenol). | 132 | 15 |
| (F) 2,2'-methylenebis(6-t-butyl-4-methylphenol). | 170 | 69 |
| (G) α,α'-Thio(3,5-dimethyl-2-hydroxyphenyl)-p-cresol. | 1,495 | 89 |
| (H) α,α-Thio(3-methoxy-2-hydroxy-5-methylphenyl)-p-cresol. | 936 | 168 |
| (I) α,α'-Thio(3-nonyl-2-hydroxy-5-methylphenyl)-p-cresol. | 1,800 | 15 |
| (J) α,α'-Thio(3,5-di-t-butyl-2-hydroxyphenyl)-4-t-butylphenol. | 864 | 157 |

The above example demonstrates the increased stabilization obtained from materials employed in the present invention as compared to those outside the scope of the present invention. For instance, a comparison of Example 6(A) with Example (C) demonstrates the unexpected excellent stabilization with trisphenol sulfides which do not contain an alkoxy substituent as required in the Baily patent. Also, a comparison of Example 6(A) with Example 6(D) demonstrates the presence of sulfur bridges between the phenolic nuclei provides for much more effective stabilization as compared to similar materials wherein the sulfur bridges are replaced with methylene bridges. In addition, a comparison of Examples 6(E) and 6(F) demonstrates that the substitution of a sulfur bridge between phenolic nuclei for a methylene bridge does not necessarily provide improved stabilization. A comparison of Example 6(A) with 6(E) shows that the presence of three phenolic nuclei provides greatly improved stabilization as compared to the presence of only two phenolic nuclei in the compound.

Moreover, a comparison of Examples 6(G) and 6(H) illustrates that a material similar to those of the present invention except that it contains methyl groups ortho to the hydroxy groups of the end phenolic radicals, does not provide the versatility achieved with the materials of the present case. Likewise, Example 6(I) illustrates that a material similar to those of the present invention except that it contains nonyl groups ortho to the hydroxy groups of the end of phenolic radicals does not provide the versatility achieved with the materials of the present case. The results obtained from the materials used in Examples 6(G) and 6(I) in polyethylene are quite good as contrasted with the relatively poor results obtained in polypropylene.

In addition, Example 6(J) illustrates that a material similar to those of the present invention except that it does not contain a methyl group para to the hydroxy group of any of the phenolic radicals, also does not provide the versatility achieved with the materials of this invention. The results obtained in polypropylene are quite good as contrasted with the relatively poor results achieved in polyethylene.

EXAMPLE 7

The product made according to Example 1 is admixed with a polyethylene of 0.960 density and about 300,000 molecular weight available under the trade designation HiFax from Hercules in a steel container and the mixture is extruded twice at 300° F. The concentration of the product made according to Example 1 is then adjusted to 0.1 percent by weight of the polymer by the addition of more of the polyethylene and the mixture is again extruded twice under the same conditions. The resulting polyethylene composition is then pressed into a 6–6.5 mil film at 310° F and 1,280 psi on a 10 inch hydraulic ram press. Likewise, there are prepared according to the above-described method, a film of the same polyethylene without any antioxidant and films of the same polyethylene containing 0.1 percent of the following:

$\alpha,\alpha'$-thio(3-t-butyl-2-hydroxy-5-methylphenyl)-p-methoxyphenol;

2,6-bis-(2'-hydroxy-3'-tert.butyl-5'-methylbenzyl)-5-methylphenol;

2,2'-thiobis-[4-methyl-6-thio-(3-t-butyl-2-hydroxy-4-methylphenyl)-phenol];

$\alpha,\alpha'$-thio(3,5-di-t-butyl-2-hydroxyphenyl)-p-cresol;

$\alpha,\alpha'$-dithio(3-t-butyl-2-hydroxy-5-methylphenyl)-p-cresol;

$\alpha,\alpha'$-dithio(3-t-butyl-2-hydroxy-5-methylphenyl)-p-methoxyphenol; and 2,2'-thiobis-[4-methyl-6-dithio-(3-t-butyl-2-hydroxy-5-methylphenyl)-phenol].

EXAMPLE 8

The product prepared according to Example 1 is admixed with a polypropylene of 0.90 density and approximately 325,000 molecular weight available under the trade designation Pro-fax 6,501 from Hercules in a steel container and the mixture is extruded twice at 380° F. The resulting polypropylene composition containing 0.5 percent by weight of the product made according to Example 1 is then pressed into a 6–6.5 mil film at 350° F and 1,280 psi on a 10 inch hydraulic ram press. Likewise, there are prepared according to the above procedure a film of the same polypropylene without any antioxidant and films of the same polypropylene containing 0.5 percent of $\alpha,\alpha'$-thio-(3,5-di-t-butyl-2-hydroxyphenyl)-p-cresol.

EXAMPLE 9

The polyethylene films produced in Example 7 are introduced into a forced draft oven which is continuously maintained at 125° ± 1° C and the polypropylene films produced in Example 8 are introduced into a forced draft oven which is continuously maintained at 150° ± 1° C. The absorbence of the films in the carbonyl region, 5.8 microns of the IR spectrum, is then recorded periodically. When absorbence reaches 94 percent the sample is considered to be "oxidized," and the time of exposure to reach this point is recorded in the table below:

| Additive | Time in hours to reach 94% absorbence | |
|---|---|---|
| | In polyethylene | In polypropylene |
| (A) $\alpha,\alpha'$-Thio(3-t-butyl-2-hydroxy-5-methylphenyl)-p-cresol (Product prepared according to Example 1). | 1,060 | 152 |
| (B) None | 50 | 4 |

| Additive | Time in hours to reach 94% absorbence | |
|---|---|---|
| | In polyethylene | In polypropylene |
| (C) 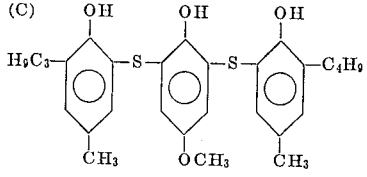 α,α'-Thio(3-t-butyl-2-hydroxy-5-methylphenyl)-p-methoxyphenol. | 425 | |
| (D) 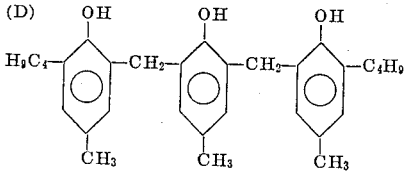 2,6'-bis(2-hydroxy-3'-tert.butyl-5'-methylbenzyl)-4-methylphenol. | 707 | |
| (E) 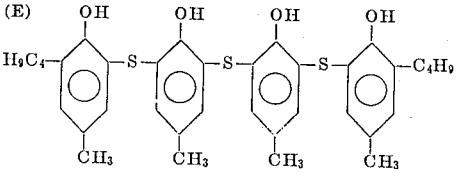 2,2'-thiobis-[4-methyl-6-thio(3-t-butyl-2-hydroxy-y-methylphenyl)-phenol]. | 527 | |
| (F) 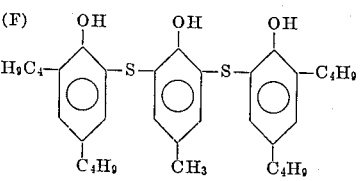 α,α'-Thio(3,5-di-t-butyl-2-hydroxyphenyl)-p-cresol (product prepared according to Example 3). | 1,097 | 170 |
| (G) 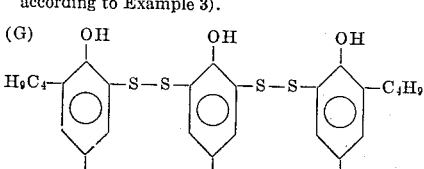 α,α'-Dithio(3-t-butyl-2-hydroxy-5-methylphenyl)-p-methylphenol. | 548 | |
| (H) 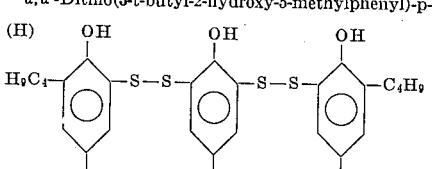 α,α'-Dithio(3-t-butyl-2-hydroxy-5-methylphenyl)-p-methoxyphenol. | 435 | |
| (I) 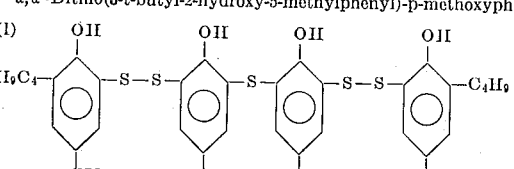 2,2'-thiobis-[4-methyl-6-dithio-(3-t-butyl-2-hydroxy-y-methyl-phenyl)-phenol]. | 502 | |

The above example further illustrates the improved stabilization obtained from the materials employed in the present invention. For instance, a comparison of Examples 9(A) and 9(F) with Example 9(C) and a comparison of Example 9(G) with 9(H) demonstrates the unexpected increased stabilization with tris phenol sulfides which do not contain an alkoxy substituent as required in the Bailey patent. In addition, a comparison of Example 9(A) with 9(D) demonstrates the importance of sulfur bridges instead of methylene bridges. Moreover, a comparison of Example 9(A) with Example 9(E) and a comparison of Example 9(G) with Example 9(I) demonstrate that increasing the number of phenolic nuclei does not necessarily improve the stabilization effect.

What is claimed is:

1. A polymer composition of increased stability against oxidative degradation comprising a polymer of an α mono-olefin of 2–4 carbon atoms and an effective stabilizing amount of compound of the general formula:

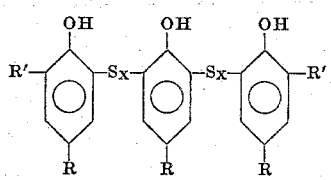

wherein $x$ is an integer of from 1 to 2, R' is tertiary butyl and each R individually is an alkyl radical of 1–4 carbon atoms, provided that at least one R is $CH_3$.

2. The composition of claim 1 wherein said mono-olefin polymer comprises at least about 85 percent by weight of at least one α mono-olefin of 2–4 carbon atoms.

3. The composition of claim 1 wherein said polymer is polyethylene.

4. The composition of claim 1 wherein said polymer is polypropylene.

5. The composition of claim 1 wherein $x$ is 1.

6. The composition of claim 1 wherein the R substituent on the middle phenolic nuclei is methyl.

7. The composition of claim 1 wherein said compound is α,α'-thio(3-t-butyl-2-hydroxy-5-methylphenyl)-p-cresol.

8. The composition of claim 1 wherein said compound is α,α'-thio(3,5-di-t-butyl-2-hydroxyphenyl)-p-cresol.

9. The composition of claim 1 which contains from about 0.005 to about 5 weight percent of said compound based upon the weight of said polymer.

10. The composition of claim 1 which contains from about 0.01 to about 1.5 weight percent of said compound based upon the weight of said polymer.

11. The composition of claim 2 wherein said compound is α,α'-thio-(3-t-butyl-2-hydroxy-5-methylphenyl)-p-cresol.

12. The composition of claim 2 wherein said compound is α,α'-thio-(3,5-di-t-butyl-2-hydroxyphenyl)-p-cresol.

* * * * *